Figure 1:
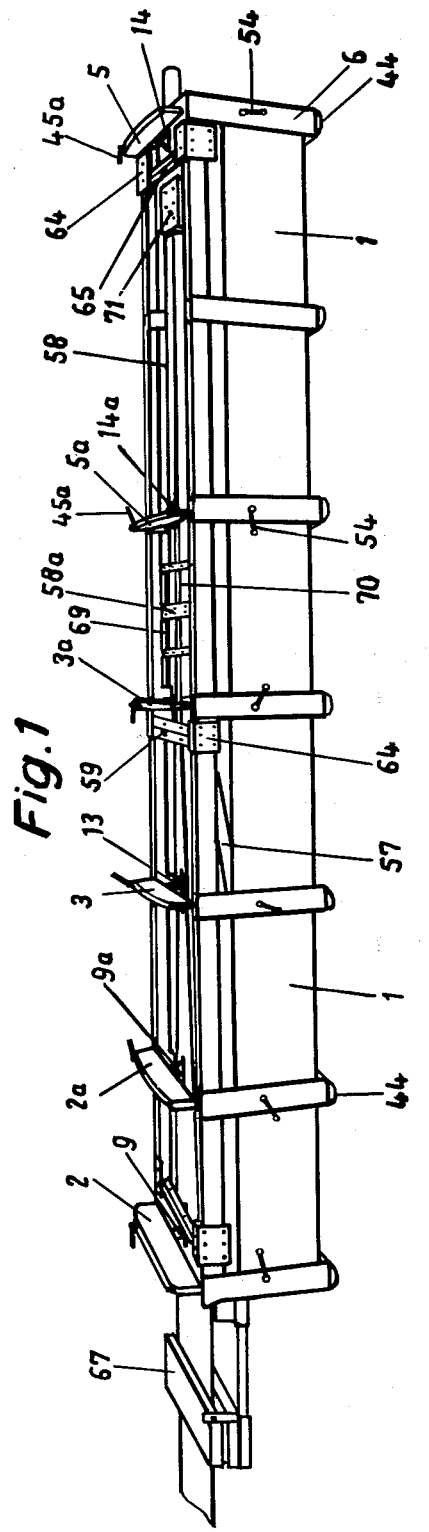

April 12, 1966 M. MAIER 3,245,242
MACHINE FOR FORMING PLANE METAL SHEETS INTO TUBES
Filed April 12, 1963 13 Sheets-Sheet 2

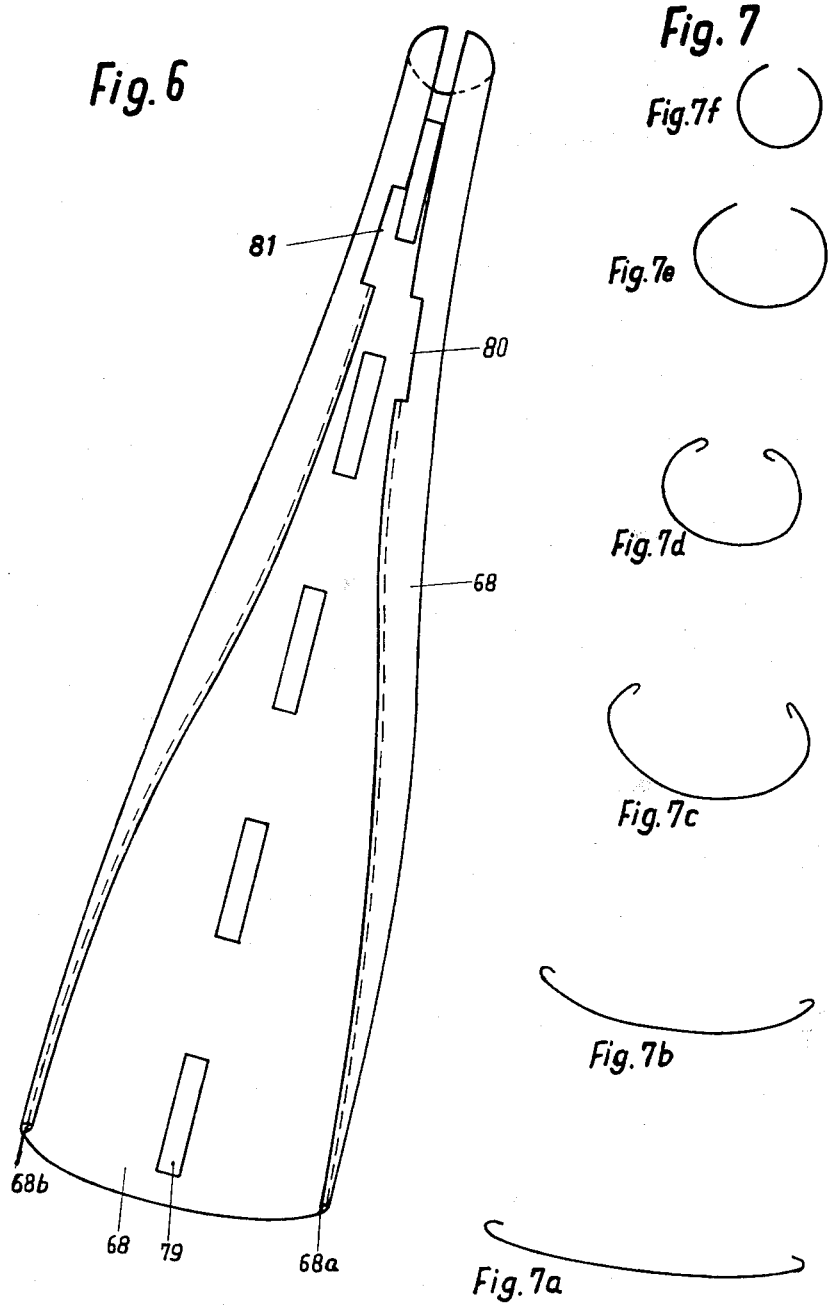

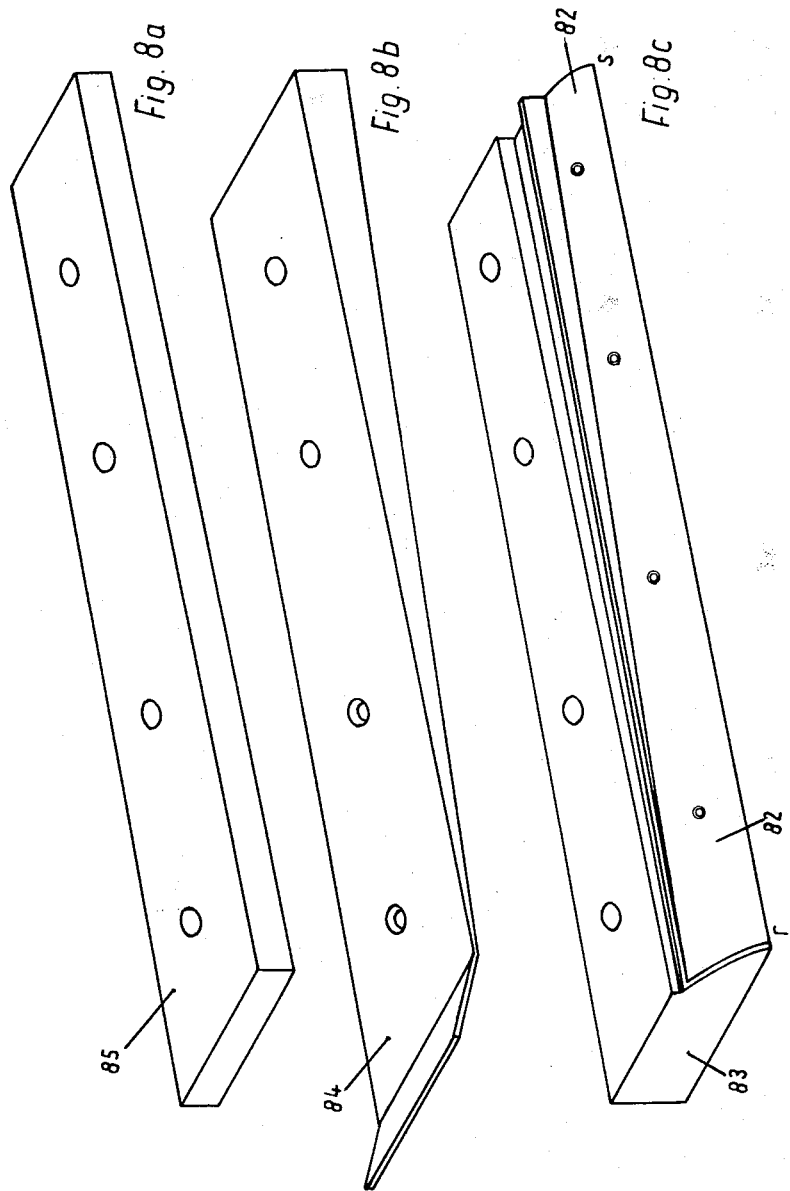

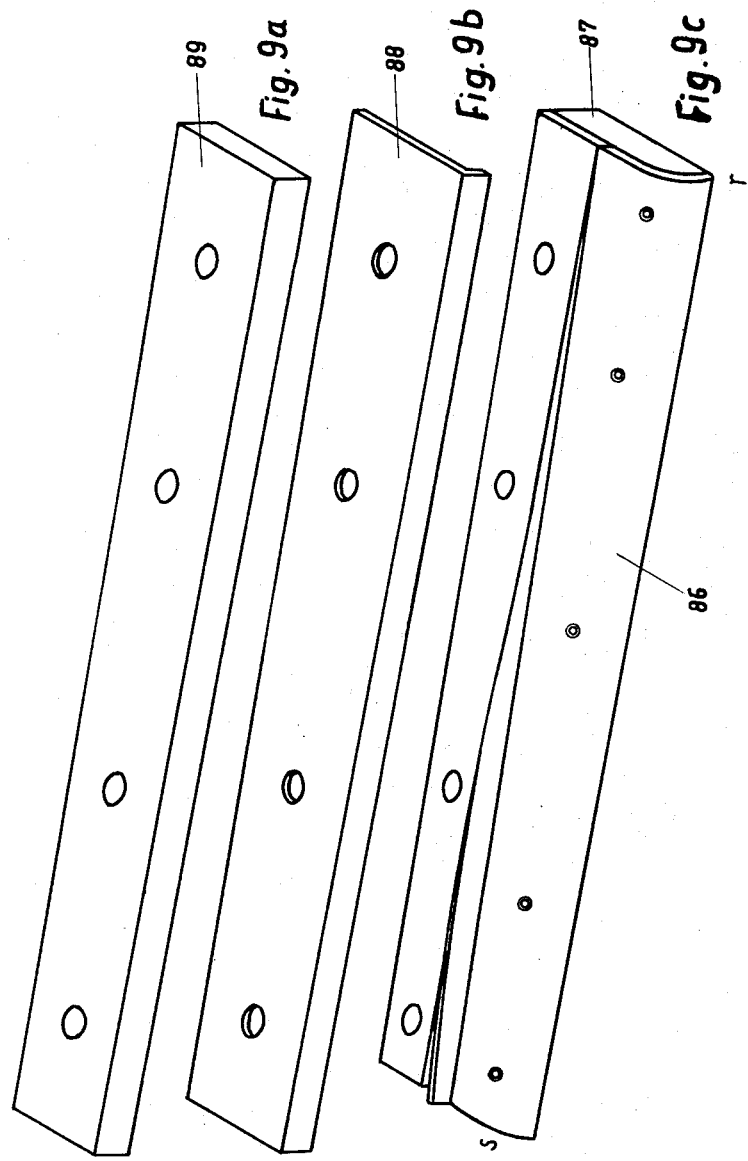

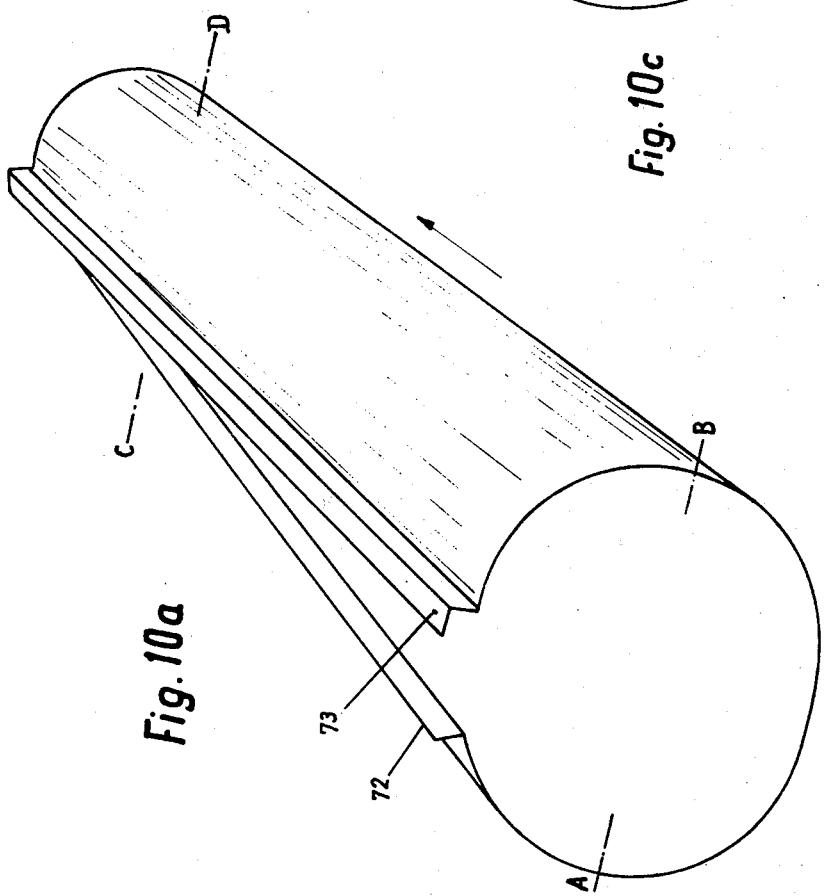
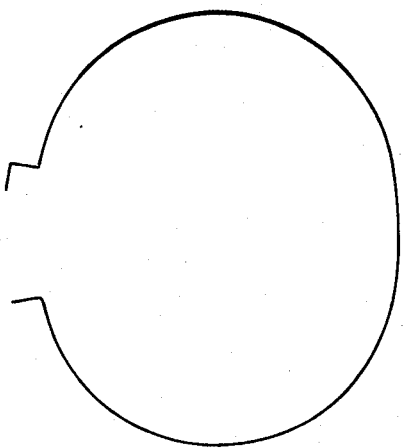

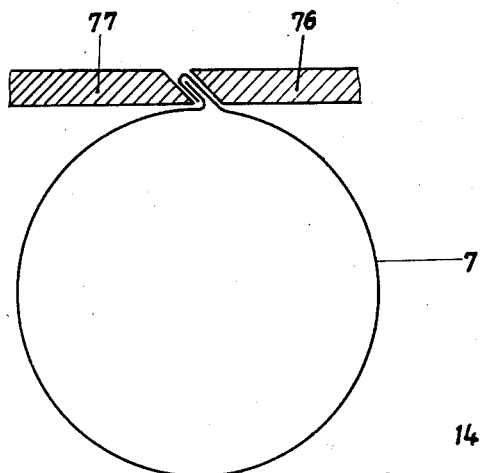
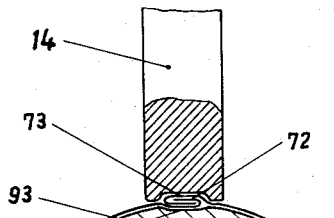
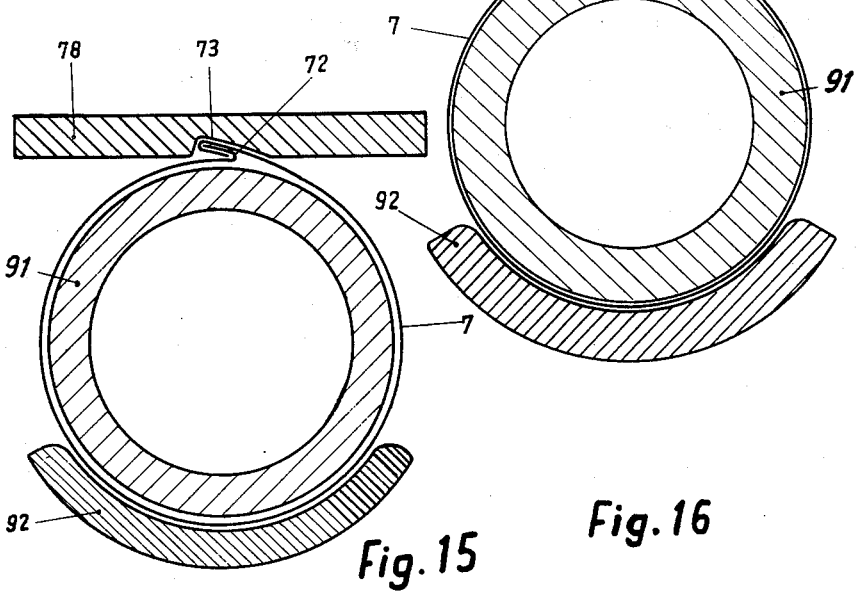
Fig. 14
Fig. 15   Fig. 16

United States Patent Office 3,245,242
Patented Apr. 12, 1966

3,245,242
MACHINE FOR FORMING PLANE METAL SHEETS
INTO TUBES
Max Maier, 60 Wiesenstrasse, Schorndorf,
Wurttemberg, Germany
Filed Apr. 12, 1963, Ser. No. 272,736
11 Claims. (Cl. 72—52)

This invention relates to a machine for bending metal sheets and more particularly to a machine for forming plane metal sheets into tubes.

In the machines of this type a sheet-metal strip is moved in its longitudinal direction by a carriage assembly back and forth over a forming device and is deformed step by step, the drive for the carriage being supplied by a motor having a reduction gear and mounted in the base of the machine.

According to the present invention a specially designed drawing carriage assembly makes it possible to form in a step-by-step process cylindrical or conically folded tubes out of a plane sheet-metal strip, which will then leave the machine as finished products. It is a feature of the present invention that the smooth sheet-metal strip or the sheet-metal web is introduced into a bending die and moved therethrough step by step and that during its movement out of the machine it is furthermore guided over a core bar resulting in a corresponding tube-shaped cross-section. The sheet-metal web, which is either wound off a roll or is cut to a desired tube length, is manually moved on the plane of the carriage through a lubricating device into the entrance of the bending die until it reaches a position below the brake shoe of a first rib which, like the brake shoes of the subsequent additional ribs holds the sheet-metal web in position during each return movement of the drawing carriage, and it is effective to release it during the forward movement of said carriage in the direction of discharged.

After having been lubricated, the sheet-metal strip being introduced moves into a bending die, the first part of which is flat and the following portions of which are increasingly curved downwardly, so that it gradually narrows into the shape of a circle or tube, respectively. Its two longitudinal edges are folded inwardly at an angle of approximately 180 degrees, wherein the sheet-metal strip will, in the course of the forming process, be elastically supported to the end of the folded edges, and each of the sheet-metal edges enters into a special folding device in which one edge is gradually bent into a so-called L-shaped fold and the other edge is gradually bent into a so-called upright fold.

In the above described forming phase, both the bending die and the sheet-metal web still have an open circular cross-section which is then converted in a sharply tapered angle into a closed circular shape. The upright fold and the L-shaped fold of the tubularly shaped sheet-metal web meet at the vertex of that angle, the upright fold being covered by the L-shaped fold. In that position, the sheet-metal web, which has now been bent into a tube and pre-folded, leaves the bending die and moves into a closing device in which the L-shaped fold is step by step placed around the upright fold and in the further course of that operation is bent together with the latter by another 90 degrees, whereby the folding connection is placed flatly on the periphery of the tube.

After having left the closing device, the now formed and closed tube is guided over a core bar which corresponds to the inside diameter of the tube and is effective to compensate deformation stresses of the sheet-metal web and to smooth the surface lines of the tube.

Due to the provision that during the forming movement the sheet-metal strip or the sheet-metal web, which is respectively cut to the dimensions of a predetermined tube caliber, is elastically supported in the turned-over edges of the bending die, and that the two free edges of the sheet-metal web are pressed into the turned-over edges by the inherent tension of the sheet metal, respectively, it is also possible by the above described method to form sheet-metal plates of a steadily decreasing width within certain limits into tubes of a conical shape. Although the diameter of the finished tube is of a conically changing size, both the folding width of the upright fold and the dimensions of the L-shaped fold will remain unchanged at all phases. The structure of the machine frame, the functioning of the braking system and the machine drive for the step-by-step forming operation are described in U.S. patent application Serial No. 767,978, now U.S. Patent No. 3,070,145.

Figure 2:
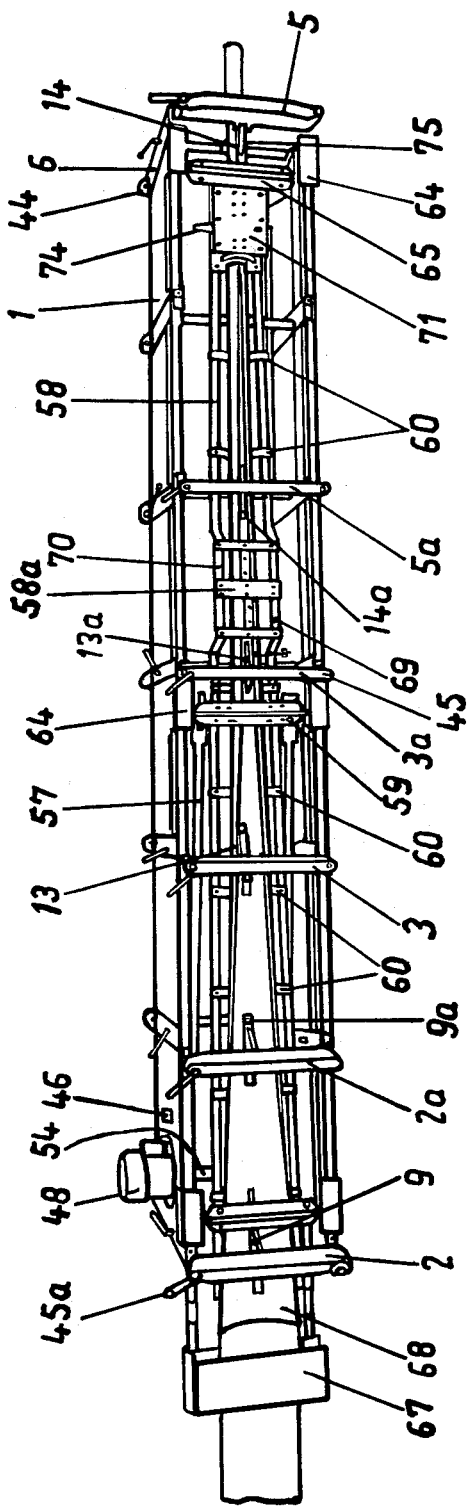
Figure 3:
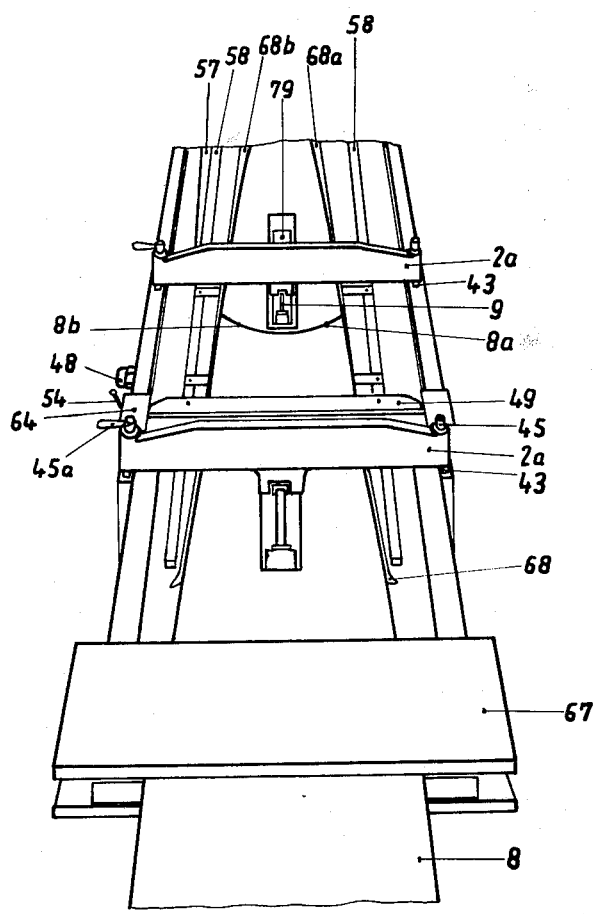

The details of the novel forming procedure and the special features of the sheet forming machine according to this invention will become apparent from the following description when read in conjunction with the accompanying drawings, in which:

FIG. 1 is a side view of the forming machine according to the invention on a greatly reduced scale, FIG. 2 shows a somewhat perspective top view of the machine of FIG. 1, FIG. 3 represents a perspective top view of the sheet-metal web and the entrance into the bending die of the machine corresponding to the lefthand portion of FIGS. 1 and 2.

Figure 4:
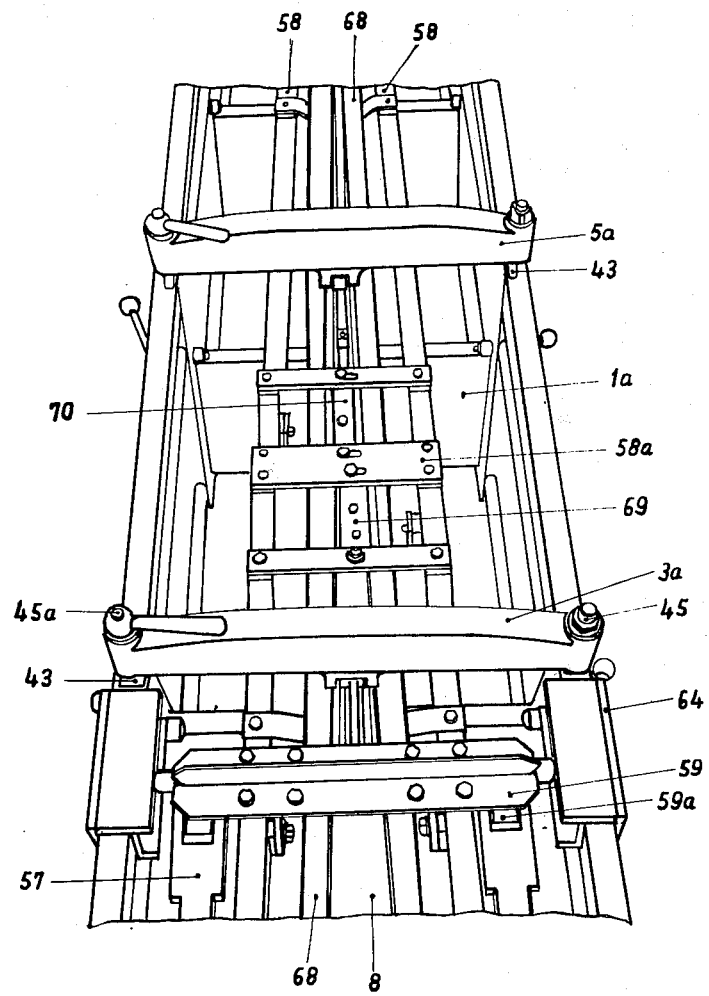
Figure 5:
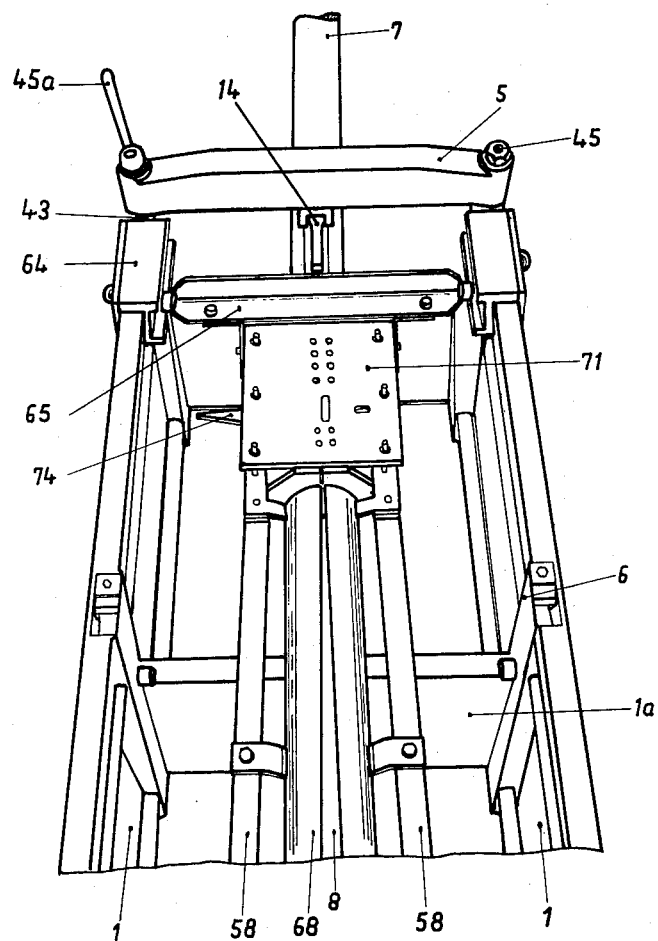
Figure 9D:
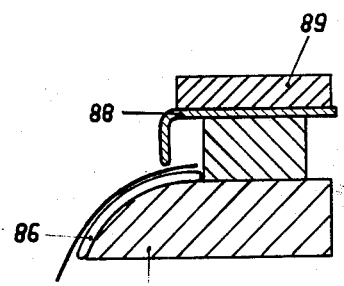
Figure 8D:
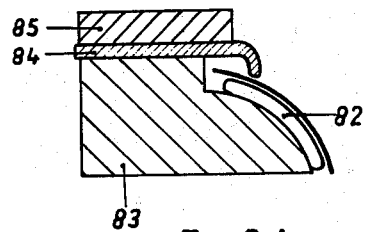
Figure 9E:
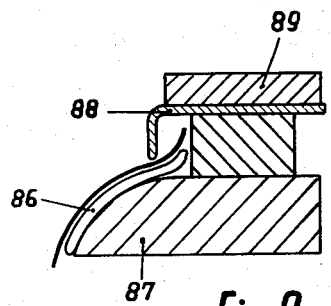
Figure 8E:
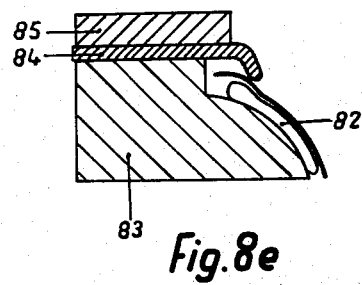
Figure 9F:
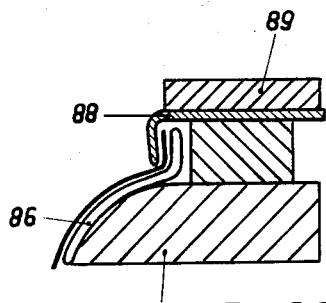
Figure 8F:
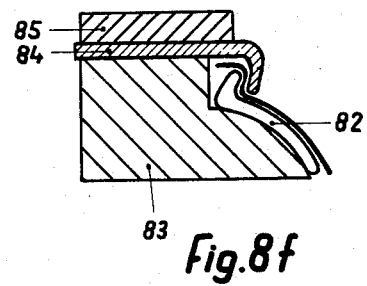
Figure 11:
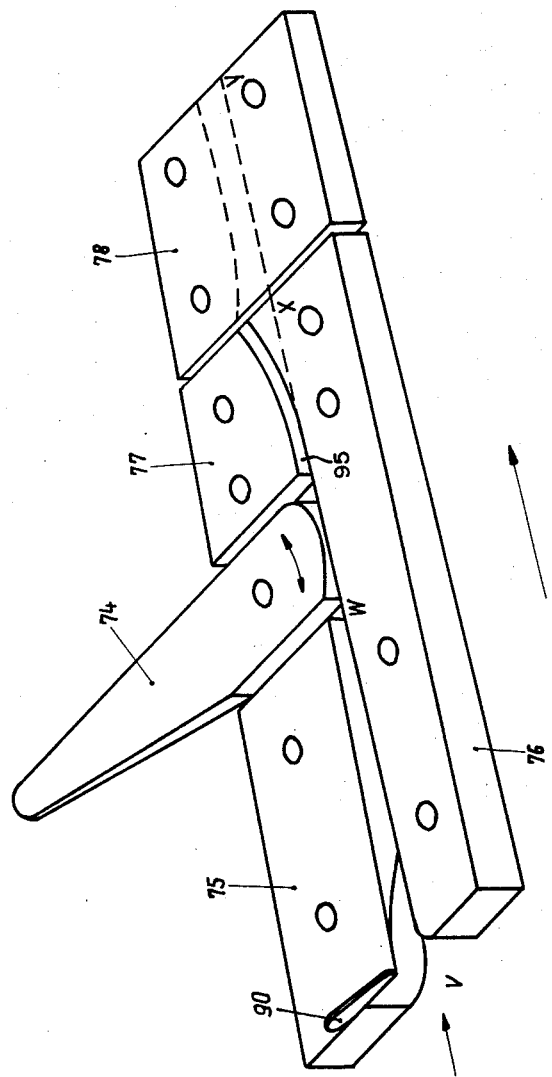
Figure 12:
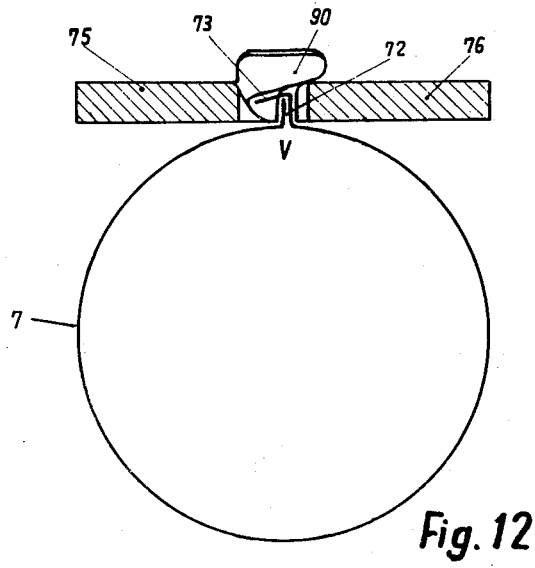
Figure 13:
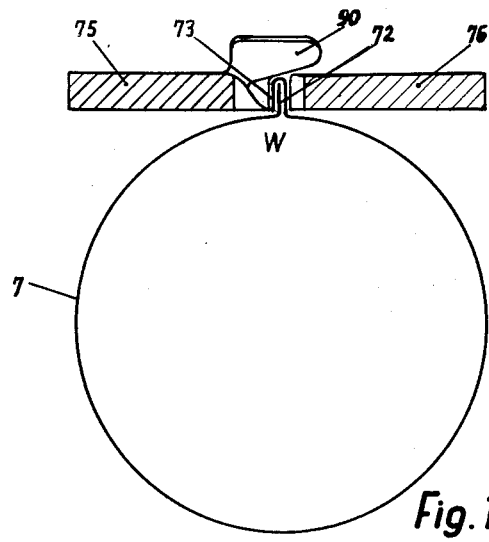
Figure 17:
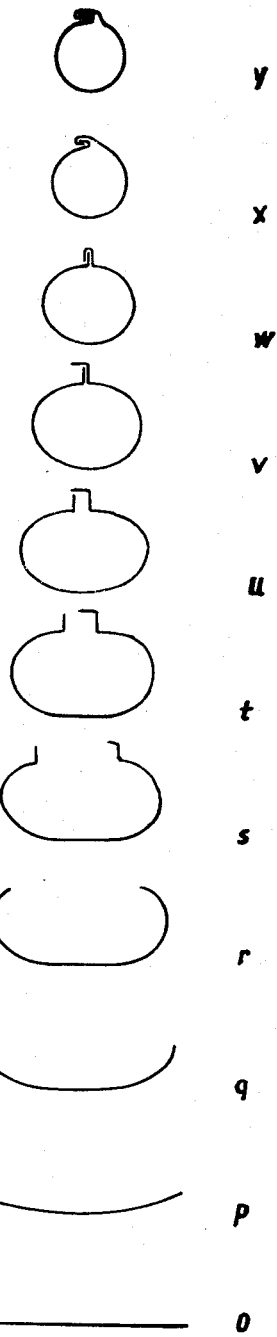

FIG. 4 shows the further structure of the bending die and the transition to the folding device, also in a perspective top view, FIG. 5 illustrates the manner in which the closing device is attached to the discharge side of the tube, FIG. 6 represents the bending die in a perspective view, FIGS. 7a, b, c, d, e, f show cross-sectional views taken through a number of points of the die shown in corresponding relationship in FIG. 6, FIGS. 8a–c illustrate the dismantled folding blade arrangement for gradually forming the L-shaped fold, while FIGS. 8d–f show cross-sections through the assembled folding arrangement and the positions of the righthand sheet-metal tube edge at those points, FIGS. 9a–c represent the dismantled folding blade arrangement for gradually forming the upright fold, and FIGS. 9d–f are cross-sectional views of the assembled folding arrangement showing the positions of the lefthand sheet-metal (tube) edge at the respective points, FIGS. 10a–c illustrate how the upright fold and the L-shaped fold are joined before the closing operation is initiated, FIG. 11 is a perspective view of the closing device with the individual elements thereof, FIG. 12 is a schematic showing, in cross-section, of the entry of the joined folds into the closing device at the point $v$ indicated in FIG. 11, FIG. 13 illustrates schematically and in cross-section how the upright fold is closed by the L-shaped fold in the closing device at point $w$ of FIG. 11, FIG. 14 is a schematic and cross-sectional illustration of how the closed upright fold is turned over by 90 degrees when leaving the closing device at point $x$ of FIG. 11, FIG. 15 is a schematic cross-sectional view taken in the discharge phase of the closed tube at point $y$ of FIG. 11, FIG. 16 is a cross-section showing how the folding seam is flattened in the discharge phase, and FIG. 17 from $c$ to $y$ schematically summarizes the individual forming and closing phases of the tube.

Referring to FIG. 1, the machine is shown in a side view. The reinforced frame 1 comprises longitudinal walls with supporting feet 6, which are provided with ground straps 44 and may be screwed in position on the floor. The cross connections between the longitudinal walls are established by means of frame portions 1*a* one of which may be seen in each of FIGS. 4 and 5. At the side not facing the observer there is provided a recess in which an electric or hydraulic motor 48 is accommodated in a housing. Said motor may be turned on and off by a switch 46. Through a reducing gear, the motor drives an eccentric 40 to be described more particularly hereafter.

The supporting feet 6, which are rigidly attached to the longitudinal walls, are hollow structures of an approximately rectangular cross-section. They contain connecting rods 43 (FIGS. 3, 4, 5) which are mounted in adjustable supports 54 and the top portions of which are reciprocable in the relatively small space of the supporting feet. The upper free ends of the connecting rods on the two longitudinal sides of the machine are connected with each other by ribs 2, 2*a*, 3, 3*a*, 5*a*, 5, the latter being vertically adjustable by handles 45*a* or screws 45 shown in the drawing. Said ribs carry, pendulously suspended in the center of their bottom sides, brake shoes 9, 9*a*, 13, 13*a*, 14*a*, 14, below which the metal sheet is passed.

The above mentioned motor 48 shown in FIG. 2 imparts a reciprocating movement to connecting rods 57 fastened to the eccentric 40 and through the joints 56 also to a drawing carriage 50. The carriage extends almost over the entire length of the machine frame and has longitudinal bars 58 held together by transversely extending links 49, 59, 65 the side pins of which are slidable in bearings 64.

Mounted on or in the drawing carriage is the actual bending or tube forming member or die 68 (see FIGS. 2 and 6), which also extends over almost the entire length of the machine and serves to form the introduced sheet-metal web into a tube.

As may be seen in the drawings, this forming member is held by the bands 60 on the longitudinal bars 58 of the carriage. Thus, when the motor is turned on, the entire carriage together with the bending die 68 will reciprocate due to the movement of the eccentric. The rotary speed of the motor is reduced from approximately 1600 to 80 r.p.m. by a conventional reduction gear not shown in the drawing.

The material to be formed into a tube is a flat sheet-metal web 8 which must have a width corresponding to the circumference of the tube. The sheet metal may be wound off a roll or measured lengths thereof may be entered which correspond to the length of the tube. It is manually passed in a flat position through a lubricating device 67 and then placed into the entrance of the die 68 until it reaches a position below the first brake shoe 9.

The bending die 68 represented in FIG. 6 is initially almost flat. According to FIG. 7*a*, the web will move into the space below the turned-over edges of the bending die 68 attached to the carriage and move with it, the bending die at this entrance portion having the cross-section drawn in FIG. 7*a*. The leading edge of the metal sheet now lies below the shoe 9 suspended from the rib 2.

The shoe 9 allows the sheet-metal web pushed into the die to slide below it without any resistance; it will, however bear down on the web and hold it in position as soon as, due to the return movement of the carriage, the web, which is clamped by the turned-over edges 68*a* and 68*b* of the die 68, also tends to move back. As a result, the die will pull itself or be pulled backwardly along the edges of the web being braked and will thus slide a few centimeters on the web in correspondence with the return movement of the carriage, thereby quite gradually continuing to deform the web in accordance with the phases illustrated in FIGS. 7*b*, 7*c*, etc. Thus, the device always operates in such a manner that when the carriage moves forwardly the sheet-metal web held by it is carried along, whereas on a return movement the latter is held in position by the pressure of the brake shoes, so that only the carriage with the bending die 68 can move backwardly, thus sliding along below the sheet-metal web.

In order to insure that during the return movement the brake shoes will not simultaneously also exert a braking action on the die fastened to the carriage, the die is at those points where the brake shoes exert their pressure on the sheet-metal web 9 provided with rectangular holes 79 the lengths of which correspond to the base surface of the brake shoes plus their movement. Below the die 68, the machine frame has mounted thereon an iron bar for putting up a sufficiently powerful resistance to the brake shoes when pressing upon the sheet-metal web sliding through the die. In the interior of the bending die 68, which during the return movement of the carriage is pushed along below the web, the web is thus held in position during the return movement by the pressure of the brake shoes.

The ribs with the brake shoes move only a small distance in the discharge direction when the drawing carriage moves forwardly together with the web carrying the loosely suspended brake shoes along due to the slight friction. When during the return movement of the drawing carriage the brake shoes bear down on the web, the ribs with the brake shoes will move backwardly again until the shoes firmly press down on the sheet metal and hold it in position. Thus, the movement of the connecting rods with the ribs is effected merely by the frictional contact with the sheet-metal web. As long as no sheet-metal web is present in the machine and below the ribs, the ribs are unable to move with the shoes.

The individual phases of the forming process result, on the one hand, from the changing shape of the bending die as shown in FIGS. 7*a* and 7*f* and, on the other hand, from the corresponding changes produced in the sheet-metal web as illustrated in FIG. 17. FIG. 7*a* shows the cross-section of the bending die after the sheet-metal web has reached the shape shown in FIG. 17*r*. In FIG. 4, this corresponds to the point where the righthand edge of the sheet-metal web is introduced into the folding device 69. At that point, the righthand sheet-metal edge emerges from the bending die 68 as starting from that point the turned-over righthand edge of the die (see 80 in FIG. 6) ends and is replaced by the righthand bending device 69 for the L-shaped fold. Thereafter, also the lefthand turned-over edge of the bending die 68 is eliminated (see 81 in FIG. 6), and at this point the lefhand edge of the sheet-metal web enters the lefthand bending device 70 for producing the so-called upright fold. After the passage through these two fold bending devices the edges of the bending die 68 continue to be without any turned-over portions.

Referring to FIGS. 8*a*–8*c* the righthand L-shaped fold bending device 69 consists of four parts 82, 83, 84, 85, which have been illustrated in a dismantled condition. The right-hand edge portion of the sheet-metal web will, during the carriage movement, positively slide between the parts 82 and 83 and is gradually advanced therein. After the L-shaped fold has been produced in the manner which will be described below, the lefthand edge portion of the sheet-metal web will enter the bending device 70 for the upright fold. That device is shown in FIGS. 9*a*–9*c* dismantled into parts 86, 87, 88, 89. Here, the lefthand edge portion of the sheet-metal web will pass between the parts 86, 87. The manner in which the folded edges are bent in these devices 69 and 70 may be seen from the cross-sectional views shown schematically in FIGS. 8*d*, *e*, *f* and 9*d*, *e*, *f*, which illustrate the positions of the righthand and lefthand sheet-metal edges and the shape of the respective fold-bending devices at various points. FIGS. 8*d* and 9*d* represent the condition shortly after the introduction of the web into the bending device, FIGS. 8*e* and 9*e* show the condition approximately in the center thereof, while FIGS. 8*f* and 9*f* respectively illustrate the discharge side of the bending devices.

After having emerged from the device 70, the bent web will have the shape represented in FIGS. 10b or 17s. In the further process (FIGS. 5, 7e, f, 17t, u v), the two edges 72 and 73 will be joned closer and will then enter the closing device 71 which is mounted below a heavy cover plate and effects the closure of the tube, as explained in FIGS. 11 and 13. The two adjacent folds 72 and 73 of the sheet-metal web, which has now already been formed into the tube 7, are bent at an angle while being held down by a center piece 90, passed between the two steel plates 75 and 76, the former of which has its inner edge formed so that the upper part of the L-shaped fold is gradually bent down and placed around the upright fold. FIG. 12 shows the position of the tube at point v in FIG. 11, FIG. 13 showing it at point w. This compressed fold wlil now pass between the lever 74 and the plate 76. Due to its frictional contact with the folded seam lever 74 oscillates within close limits with the reciprocating carriage movement, so that the seam is compressed further. At w the seam enters a guide slot 95 between parts 77 and 76 the inner edges of which are effective to press down the folded seam which until then has been upright (FIG. 14). Finally, the tube thus folded will pass below the last part 78 of the closing device and slide upon a core bar 91, the diameter of which corresponds to that of the tube. By the shoe 14a on rib 5a, the tube is detained step by step and pressed upon the core bar 91 in order to produce a more uniform roundness of the tube, if required. On its top side and below the folded seam of the tube, the core bar is provided with a shallow groove 93 into which the shoe 14 of the rib 5 will urge the fold. At 92 there is shown a support for the core bar which in turn is attached to the extension of the shoe 14a.

In order to be ready for use, it is necessary as a rule that the tube have at one end thereof a diameter reduced by one or several millimeters, i.e. it must be of a slightly conical shape so that it may be fitted together with the preceding tube or an extension. For that purpose, the sheet-metal strips are cut a little narrower at their leading ends before being introduced into the machine. In spite of that, their movement through the machine will be the same, because due to the stiffness of the sheet metal their edges will be clamped in the turned-over forming edges of the bending device with the same force, and thus the same fold will be produced as on the remaining adjacent part of the tube. Of course, the diameter of the core bar over which the finished tube is pushed must not exceed that of the smallest tube caliber.

What is claimed is:

1. The method of forming metal sheets into a tubular body comprising:
   (a) feeding sheet metal into an elongate die,
   (b) maintaining said sheet metal substantially stationary,
   (c) longitudinally moving said die in the direction from which said sheet metal is fed,
   (d) moving said sheet metal and said die together in the feeding direction,
   (e) repeating steps (b), (c) and (d) to produce a tubular body having an open seam,
   (f) bending the two edges of said open seam together to form a closed seam,
   (g) and pressing said closed seam against the periphery of the tubular body.

2. The method of forming metal sheets into a tubular body comprising:
   (a) feeding sheet metal into an elongate die,
   (b) maintaining said sheet metal substantially stationary,
   (c) longitudinally moving said die in the direction from which said sheet metal is fed,
   (d) moving said sheet metal and said die together in the feeding direction,
   (e) repeating steps (b), (c) and (d) to produce a tubular body having an open seam,
   (f) bending the two edges of said open seam outwardly to form opposed folds adapted to extend one over the other,
   (g) bending said one fold over said other fold in adjacent parallel relationship to form a closed seam,
   (h) bending the closed seam toward one side,
   (i) and pressing the seam down against the periphery of the tubular body.

3. The method defined in claim 1, further including the step of moving said tubular body over a core bar.

4. The method defined in claim 1, further including the step of providing one end of said tubular body with a reduced diameter.

5. The method of forming metal sheets into a tubular body comprising:
   (a) feeding sheet metal into an elongate die,
   (b) maintaining said sheet metal substantially stationary,
   (c) longitudinally moving said die in the direction from which said sheet metal is fed,
   (d) moving said sheet metal and said die together in the feeding direction,
   (e) repeating steps (b), (c) and (d) to produce a tubular body having an open seam,
   (f) bending one edge of said open seam outwardly and transversely to form an L-shaped fold,
   (g) bending subsequently the outer edge of said open seam outwardly to form an upright fold,
   (h) advancing said folds toward each other placing said upright fold under the leg portion of the L-shaped fold,
   (i) bending the traverse leg of said L-shaped fold over said upright fold in close parallel relationship,
   (j) pressing said parallel folds against each other to form a closed seam,
   (k) bending said closed seam toward one side,
   (l) and pressing said bent seam downwardly against the periphery of said tubular body.

6. A tube forming machine comprising in combination a frame, a carriage mounted for reciprocating movement in said frame, an elongate die fixed to said carriage and adapted to receive a metal sheet, said elongate die being substantially flat at the sheet input end and provided with inwardly bent lateral edges, said elongate die curving gradually upwardly and inwardly from the feeding end toward the discharge end defining a substantially circular cross-section at the discharge end, means for imparting a reciprocating movement to said carriage, said carriage advancing the metal sheet together with said die during its forward stroke, means for retaining said metal sheet in position during the return stroke of said carriage to push said metal sheet step wise further into said die to form a tubular body having an open seam, edge folding means for receiving and bending the opposite edges of the open seam to provide opposite folds extending one over the other, and seam closing means mounted above said die adjacent the discharge end adapted to close said seam and fold said seam against the periphery of the tube.

7. A tube forming machine comprising in combination a frame, a movable carriage mounted in said frame, eccentric means operatively connected to said carriage and adapted to drive said carriage in a reciprocating movement in said frame, an elongate die fixed to said carriage for reciprocating movement therewith, said die being substantially flat at the sheet input side and having inwardly turned sheet retaining edges, said die curving gradually upwardly and inwardly from the feeding end toward the discharge end and presenting a substantially circular form at the discharge end, said carriage advancing said metal sheet together with said die during the forward stroke of its reciprocating movement, brake means on said frame for holding said metal sheet in position during the return stroke of said carriage and said die to push said metal sheet step-wise into said die forming a tubular body having an open seam, longitudinally spaced edge folding means mounted on said carriage above said die and adapted to engage the opposite edges of said open seam, one edge folding means providing an upright fold on one edge and the other edge folding means providing an L-shaped fold on the other edge and adapted to extend over said upright fold on said one edge, a seam closing device mounted on said carriage above said die forwardly of said edge folding means and adapted to bend the transverse leg of said L-shaped fold over said upright fold in close parallel relationship, and means for pressing said closed seam sideways and against the periphery of said tubular body.

8. A tube forming machine according to claim 7 wherein said elongate die is provided with slots below said brake means, said slots having substantially the same outline as the base contour of said brake means, and a support bar extending below said die in alignment with said brake means.

9. A tube forming machine according to claim 7 wherein a cylindrical core member is pivotally mounted on a brake means at the discharge end of said die and adapted to be inserted into said tubular body.

10. A tube forming machine according to claim 9 wherein said core member has a depression in its surface in alignment with said folded seam.

11. A tube forming machine according to claim 7 wherein a lubricating device for said metal sheet is provided at the feeding end of said elongate die.

References Cited by the Examiner
UNITED STATES PATENTS

| | | | |
|---|---|---|---|
| 137,992 | 4/1873 | Wilmot | 113—33 |
| 715,570 | 12/1902 | Friel | 113—33 |
| 2,333,997 | 11/1943 | Glans | 113—54 |
| 2,700,408 | 1/1955 | Babbitt | 113—33 |
| 3,070,145 | 12/1962 | Maier | 153—21 |

RICHARD J. HERBST, *Primary Examiner.*

CHARLES W. LANHAM, *Examiner.*